United States Patent
Lee et al.

(10) Patent No.: US 8,938,261 B2
(45) Date of Patent: Jan. 20, 2015

(54) MOBILE TERMINAL AND METHOD OF CONTROLLING THE SAME

(71) Applicant: LG Electronics Inc., Seoul (KR)

(72) Inventors: Seokhee Lee, Seoul (KR); Mikyung Kim, Seoul (KR); Hyoungrae Kim, Seoul (KR); Sungmok Shin, Seoul (KR); Myonggu Lee, Gwacheon-Si (KR); Sangho Choi, Gwacheon-Si (KR); Seongpyo Hong, Seongnam-Si (KR); Sanghyuk Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 13/672,008

(22) Filed: Nov. 8, 2012

(65) Prior Publication Data

US 2013/0115974 A1 May 9, 2013

(30) Foreign Application Priority Data

Nov. 8, 2011 (KR) .......................... 10-2011-0115991

(51) Int. Cl.
*H04W 88/00* (2009.01)
*H04W 4/02* (2009.01)

(52) U.S. Cl.
CPC .................................... *H04W 4/025* (2013.01)
USPC ....................................................... 455/456.5

(58) Field of Classification Search
USPC .......................... 455/456.5, 41.2; 725/59, 131
See application file for complete search history.

(56) References Cited

U.S. PATENT DOCUMENTS

| | | | | |
|---|---|---|---|---|
| 2012/0196571 A1* | 8/2012 | Grkov et al. | ................... | 455/411 |
| 2013/0116038 A1* | 5/2013 | Alderucci et al. | ............... | 463/25 |
| 2013/0268357 A1* | 10/2013 | Heath | ......................... | 705/14.53 |

* cited by examiner

*Primary Examiner* — Diane Mizrahi
(74) *Attorney, Agent, or Firm* — Ked & Associates, LLP

(57) ABSTRACT

A mobile terminal is allowed to automatically reproduce contents by a user-desired device based on its own position and orientation. A method for controlling contents reproduction in a mobile terminal includes acquiring at least one of position and orientation of the mobile terminal, selecting one of a plurality of external devices based on the acquired at least one of the position and the orientation, the plurality of external devices being capable of reproducing contents at different positions, respectively, and transmitting a signal to the selected one external device for controlling the selected one external device to reproduce the contents.

19 Claims, 13 Drawing Sheets

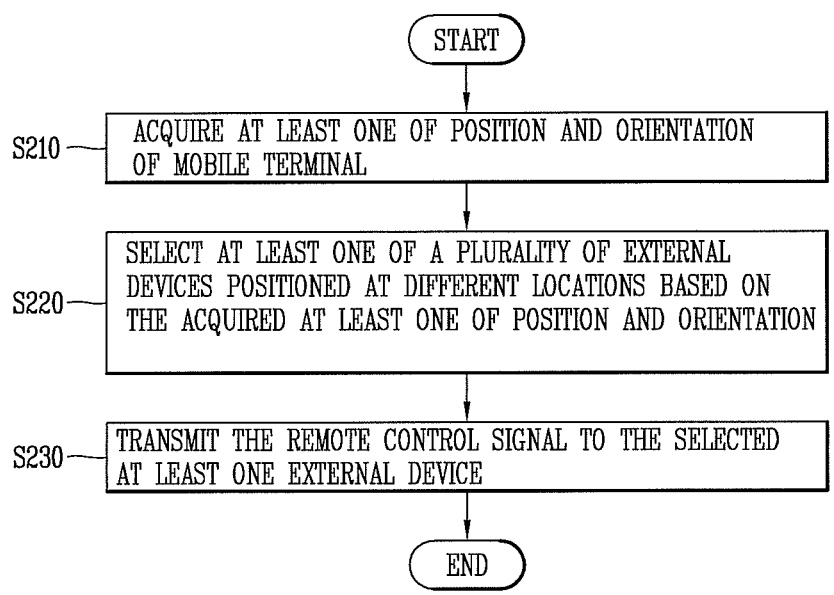

MOBILE TERMINAL AND METHOD OF CONTROLLING THE SAME

CROSS-REFERENCE TO RELATED APPLICATION(S)

This application claims priority under 35 U.S.C. §119 to Korean Application No. 10-2011-0115991 filed in Korea on Nov. 8, 2011, whose entire disclosure(s) is/are hereby incorporated by reference.

BACKGROUND

1. Field

This specification relates to a mobile terminal and a method of controlling the same method.

2. Background

Mobile terminals and methods of controlling the same are known. However, they suffer from various disadvantages.

BRIEF DESCRIPTION OF THE DRAWINGS

The embodiments will be described in detail with reference to the following drawings in which like reference numerals refer to like elements, wherein:

FIG. 15 is a flowchart of a process of controlling an external device in the mobile terminal in accordance with one embodiment.

DETAILED DESCRIPTION

Figure 1:
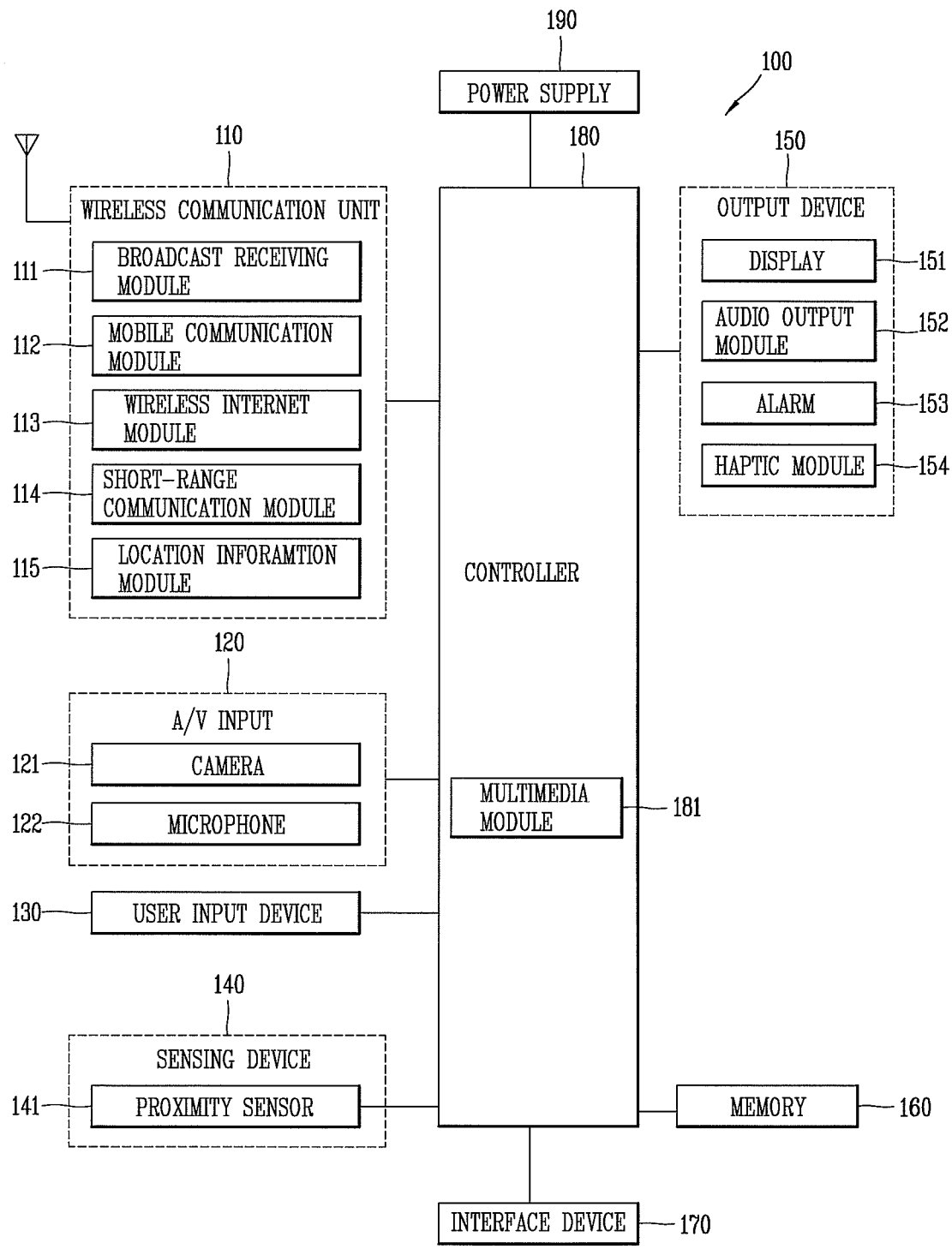
FIG. 1 is a is a block diagram of a mobile terminal in accordance with one exemplary embodiment.

Description will now be given in detail of a mobile terminal with reference to the accompanying drawings. This specification employs like/similar reference numerals for like/similar components irrespective of different embodiments, so they all will be understood by the first description. Hereinafter, suffixes "module" and "device or portion" for components used herein in description are merely provided only for facilitation of preparing this specification, and thus they are not granted a specific meaning or function. If a detailed explanation for a related known function or construction is considered to unnecessarily divert the gist of the present disclosure, such explanation has been omitted but would be understood by those skilled in the art. The accompanying drawings are used to help easily understood the technical idea of the present disclosure and it should be understood that the idea of the present disclosure is not limited by the accompanying drawings.

Terminals may be divided into mobile/portable terminals and stationary terminals according to their mobility. Also, the mobile terminals may be categorized into a handheld terminal and a vehicle mount terminal according to whether it is directly portable by a user. The mobile terminal may be multifunctional and configured to, for example, capture still images or moving images, play music or video files, play games, receive broadcast, or the like, so as to be implemented as an integrated multimedia player. Functionality for the multimedia devices may be implemented in hardware or software.

As broadly descried and embodied herein, the mobile terminal may continuously reproducing contents and provide improved methods of selecting an external device, for example, the mobile terminal may automatically play (reproduce) the contents through a user-desired device based on its own position and orientation.

Moreover, a plurality of external devices may be controlled using a single mobile terminal configured to select an external device by allowing the mobile terminal to remotely control a user-desired device based on its own position and orientation.

Mobile terminals described in this specification may include mobile phones, smart phones, laptop computers, digital broadcasting terminals, personal digital assistants (PDAs), portable multimedia players (PMPs), navigators, and the like. However, it can be easily understood by those skilled in the art that the configurations according to the embodiments disclosed in this specification can be applied to stationary terminals, such as digital TV, desktop computer and the like, where applicable.

Digital Living Network Alliance (DLNA) is articles or interoperability guidelines which implement sharing digital contents among household alliances connected via a home network. Home networking technologies include a technology of constructing a physical network, such as Ethernet, Home Phoneline Networking Alliance (HomePNA), Radio Frequency (RF), Power Line Communication (PLC) and the like, a communication protocol technology among devices, sensors and actuators which construct a home network, a middleware technology for mutual discovery, configuration and management among devices on a constructed home network, and a service technology based on such middleware.

Digital home is an evolution of an idea that personal computers, household electronics and mobile devices work together seamlessly via a wired or wireless network to share digital contents within a home environment. Digital living extends that idea to include sharing of digital contents through an immediate connection between digital devices on the go as well, regardless of the manufacturer.

DLNA provides guidelines for interoperation in aspects of networking, device discovery and control, media management, media format, media transmission and the like. The DLNA has employed an Internet Protocol (IP) as a basic network protocol for networking and connectivity. The DLNA recommends Universal Plug and Play Device Architecture (UPnP DA) based on Simple service Discovery Protocol (SSDP), General Event Notification Architecture (GENA), and Simple Object Access Protocol (SOAP) for interoperability of the device discovery and control, and to employ the UPnP AV as an interoperable protocol for media contents management. The DLNA is also recommends audio, image, video formats in an independent manner for the media contents format, and HTTP as an interoperable protocol for the media transmission.

Hereinafter, for the sake of explanation, description will be given under assumption that a mobile terminal in accordance with at least one exemplary embodiment disclosed in this specification shares digital contents or transceives digital contents-related information with other electronics (for example, digital media renderer). Here, the configuration that the mobile terminal operates according to the DLNA is merely illustrative, and thus it should be construed that the scope of the embodiments disclosed in this specification are not limited thereto.

That is, a mobile terminal as broadly described and embodied herein may transmit or receive digital data to or from other electronics according to any type of home networking technologies, which allow transmission and reception of digital data between electronics, or home network protocols. For example, a mobile terminal may transmit or receive digital data to or from other electronics according to a home networking technology based on a wireless local area network having a device discovery and management mechanism.

FIG. 1 is a block diagram of a mobile terminal in accordance with one exemplary embodiment. The mobile terminal 100 may include components, such as a wireless communication unit 110, an Audio/Video (A/V) input device 120, a user input device 130, a sensing device 140, an output device 150, a memory 160, an interface device 170, a controller 180, a power supply 190, or the like. FIG. 1 shows the mobile terminal 100 having various components, but it is understood that implementing all of the illustrated components is not a requirement. Greater or fewer components may alternatively be implemented.

The wireless communication device 110 may typically include one or more modules, which permit wireless communications between the mobile terminal 100 and a wireless communication system or between the mobile terminal 100 and a network within which the mobile terminal 100 is located. For example, the wireless communication device 110 may include a broadcast receiving module 111, a mobile communication module 112, a wireless internet module 113, a short-range communication module 114, a location information module 115 and the like.

The broadcast receiving module 111 receives a broadcast signal and/or broadcast associated information from an external broadcast managing entity via a broadcast channel. Examples of broadcast associated information may include information associated with a broadcast channel, a broadcast program, a broadcast service provider, and the like. The broadcast associated information may be provided via a mobile communication network, and received by the mobile communication module 112. Broadcast signals and/or broadcast associated information received via the broadcast receiving module 111 may be stored in a suitable device, such as a memory 160.

The mobile communication module 112 may transmit/receive wireless signals to/from at least one of network entities (e.g., base station, an external mobile terminal, a server, etc.) on a mobile communication network. Here, the wireless signals may include an audio call signal, a video (telephony) call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The location information module 115 denotes a module for detecting or calculating a position of a mobile terminal. An example of the location information module 115 may include a Global Position System (GPS) module.

Referring to FIG. 1, the A/V input device 120 may be configured to provide audio or video signal input to the mobile terminal. The A/V input device 120 may include a camera 121 and a microphone 122. The camera 121 may receive and process image frames of still pictures or video obtained by image sensors in a video call mode or a capturing mode. The processed image frames may be displayed on a display 151.

The image frames processed by the camera 121 may be stored in the memory 160 or transmitted to an external device via the wireless communication device 110. Two or more cameras 121 may be provided according to the configuration of the mobile terminal 100.

The microphone 122 may receive an external audio signal while the mobile terminal 100 is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input device 130 may generate input data input by a user to control the operation of the mobile terminal 100. The user input device 130 may include a keypad, a dome switch, a touchpad (e.g., static pressure/capacitance), a jog wheel, a jog switch and the like.

The sensing device 140 may provide status measurements of various aspects of the mobile terminal 100. For instance, the sensing device 140 may detect an open/close status of the mobile terminal 100, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing device 140 may sense whether a sliding portion of the mobile terminal is open or closed. Other examples include sensing functions, such as the sensing device 140 sensing the presence or absence of power provided by the power supply 190, the presence or absence of a coupling or other connection between the interface device 170 and an external device. Meanwhile, the sensing device 140 may include a proximity sensor 141.

The output device 150 may serve to output an audio signal (or an auditory signal), a video signal (or visual signal), an alarm signal or a tactile signal. The output device 150 may include a display (or a display device) 151, an audio output module 152, an alarm (or an alarm device) 153, a haptic module 154, and the like.

The display 151 may output information processed in the mobile terminal 100. For example, when the mobile terminal is operating in a phone call mode, the display 151 may provide a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

The display 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display, or the like.

Some of the displays can be configured to be transparent such that it is possible to see the exterior therethrough. These displays may be called transparent displays. A representative example of the transparent display may include a Transparent Organic Light Emitting Diode (TOLED), or the like. The rear surface of the display device 251 may also be implemented to be optically transparent. Under this configuration, a user can view an object positioned at a rear side of a terminal body through a region occupied by the display device 251 of the terminal body.

The display device 251 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display 151 has been touched.

Still referring to FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

The audio output module 152 may output audio data received from the wireless communication device 110 or stored in the memory 160 in a call-receiving mode, a call-placing mode, a recording mode, a voice recognition mode, a broadcast reception mode, and the like. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include a call received, a message received, a key signal input, a touch input, and the like. The alarm 153 may output not only video or audio signals, but also other types of signals such as signals notifying occurrence of events in a vibration manner. Since the video or audio signals can be output through the display 151 or the audio output device 152, the display 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface device 170 may generally be implemented to interface the mobile terminal 100 with external devices. The interface device 170 may allow a data reception from an external device, a power delivery to each component in the portable terminal 100, or a data transmission from the portable terminal 100 to an external device. The interface device 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface device 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. Moreover, the controller 180 can perform a pattern recognition processing so as to recognize writing or drawing input on the touch screen as text or image.

The power supply device 190 provides power required by various components under the control of the controller 180. The provided power device may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic devices designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2A:
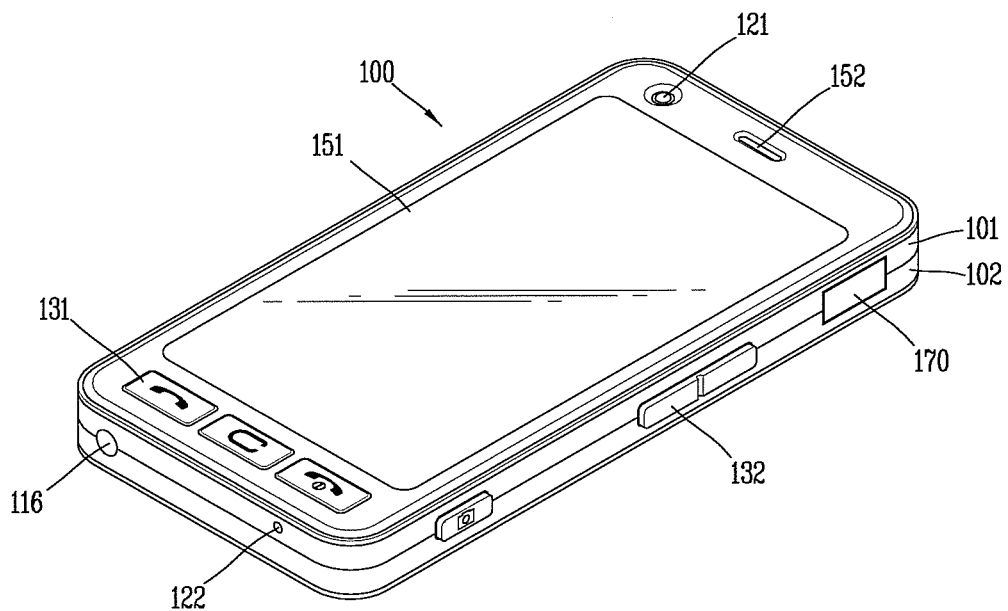
FIGS. 2A and 2B are perspective views of a mobile terminal.
Figure 2B:
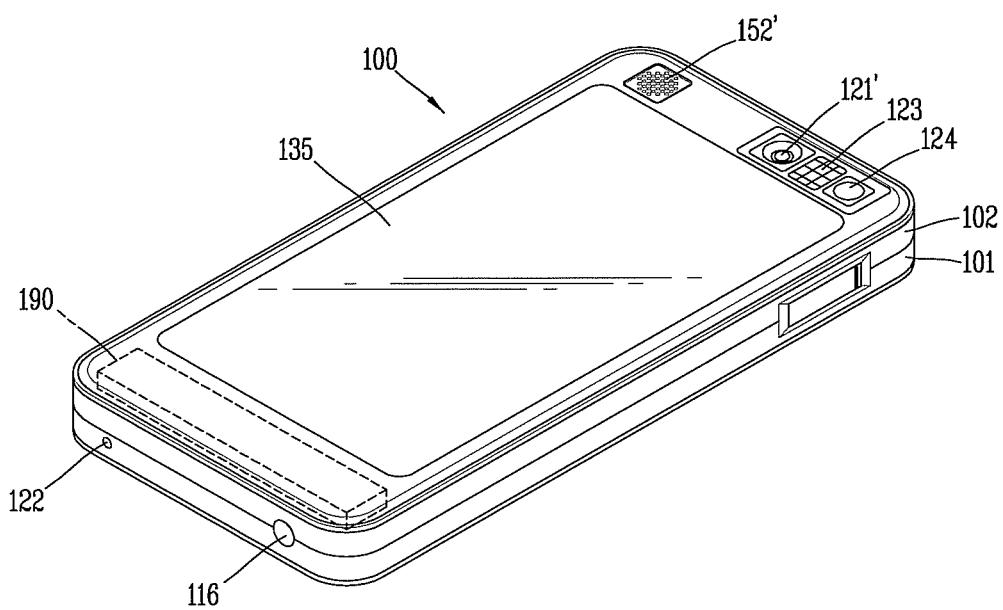

FIGS. 2A and 2B are perspective views showing an appearance of a mobile terminal. FIG. 2A shows a front surface and one side surface of the mobile terminal, and FIG. 2B shows a rear surface and another side surface of the mobile terminal.

As shown in FIG. 2A, the mobile terminal 100 disclosed herein is provided with a bar-type terminal body. However, the present application is not limited to this type of terminal, but is also applicable to various structures of terminals such as slide type, folder type, swivel type, swing type, and the like, in which two or more bodies are combined with each other in a relatively movable manner.

The body may include a case (casing, housing, cover, etc.) defining an outer appearance. In this exemplary embodiment, the case may be divided into a front case 101 and a rear case 102. Various electronic components may be mounted in a space between the front case 101 and the rear case 102. At least one intermediate case may further be interposed between the front case 101 and the rear case 102. Such cases may be injected using a synthetic resin or be formed of a metal, such as stainless steel (STS), titanium (Ti) or the like.

The terminal body may include a display 151, an audio output module 152, a camera 121, a user input device 130, a microphone 122, an interface device 170, and the like. The display 151 may occupy most of a main surface of the front case 101. The audio output module 152 and the camera 121 may be disposed near one of both end portions of the display 151, and the user input device 131 and the microphone 122 on the other end portion of the display 151. The user input device 132, the interface device 170, and the like, may be disposed on side surfaces of the front and rear cases 101 and 102.

The user input device 130 may be manipulated to allow inputting of commands for controlling operations of the mobile terminal 100, and include a plurality of manipulation devices 131, 132. The first and second manipulation devices 131, 132 may be referred to as a manipulating portion. Such manipulating portion can employ any tactile manner that a user can touch or tap for manipulation.

The first and second manipulation devices 131, 132 may be set to allow inputting of various contents. For example, the first manipulation device 131 may be configured to input commands such as START, END, SCROLL or the like, and the second manipulation device 132 may be configured to input commands, such as a volume adjustment of sounds output from the audio output module 152, conversion of the display 151 into a touch recognition mode, or the like.

Referring to FIG. 2B, a rear face of the terminal body, namely, the rear case 102 may further be provided with a camera 121'. The camera 121' faces a direction which is opposite to a direction faced by the camera 121 (see FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use.

The cameras 121 and 121' may be installed in the terminal body to be rotatable or popped up. A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may further be disposed at a rear face of the terminal body. The audio output module 152' can cooperate with the audio output module 152 (see FIG. 2A) to provide stereo output. Also, the audio output module 152' may be configured to operate as a speakerphone.

A broadcast signal receiving antenna 116 may further be disposed at one side of the terminal body in addition to an antenna for communications, for example. The antenna 116 configuring a part of the broadcast receiving module 111 (see FIG. 1) may be retractable into the terminal body.

A power supply device 190 for supplying power to the mobile terminal 100 may be mounted in the terminal body. The power supply device 190 may be mounted in the terminal body or detachably coupled directly onto the outside of the terminal body.

The rear case 102 may be further provided with a touchpad 135 for detecting a touch input. Similar to the display 151, the touchpad 135 may be implemented as a light-transmissive type. Also, the touchpad 135 may be further provided with a rear display device for outputting visual information. Here, information output on the front display 151 and the rear display device may be controlled by the touchpad 135.

The touchpad 135 may operate cooperative with the display 151. The touchpad 135 may be disposed at a rear side of the display 151 in parallel to the display 151. The touchpad 135 may have a size the same as or smaller than that of the display 151.

Hereinafter, description will be given in detail of a mobile terminal which plays (reproduces) contents on a user desired device according to the user condition according to one embodiment.

FIGS. 3A to 3D are diagrams illustrating an environment where a plurality of devices are disposed. The location 10 may be any space, such as, for example, a room at the home, office, or the like. As shown in FIGS. 3A to 3D, a mobile terminal 100, a server 200S and a plurality of devices 200A to 200C may be positioned in the location 10.

The mobile terminal 100 may discover contents stored therein or contents existing in the server 200S, and the corresponding contents may be played by the mobile terminal 100 or the plurality of devices 200A to 200C. Examples of the mobile terminal 100 may include cellular phone, Internet tablet, Wi-Fi supported digital camera, Personal Digital Assistant (PDA), and the like.

The server 200S may store contents, and provide such contents to the plurality of devices 200A to 200C connected to a network. The server 200S may also protect the stored contents. Examples of the server 200S may include Personal Computer (PC), Network Attached Storage (NAS), and the like.

The plurality of devices 200A to 200C may play the contents received from the mobile terminal 100. Examples of the plurality of devices 200A to 200C may include TV, A/V receiver, video display, remote speaker for music, and the like. It should be appreciated that any one device may be designated as a server device or client device.

Figure 3A:
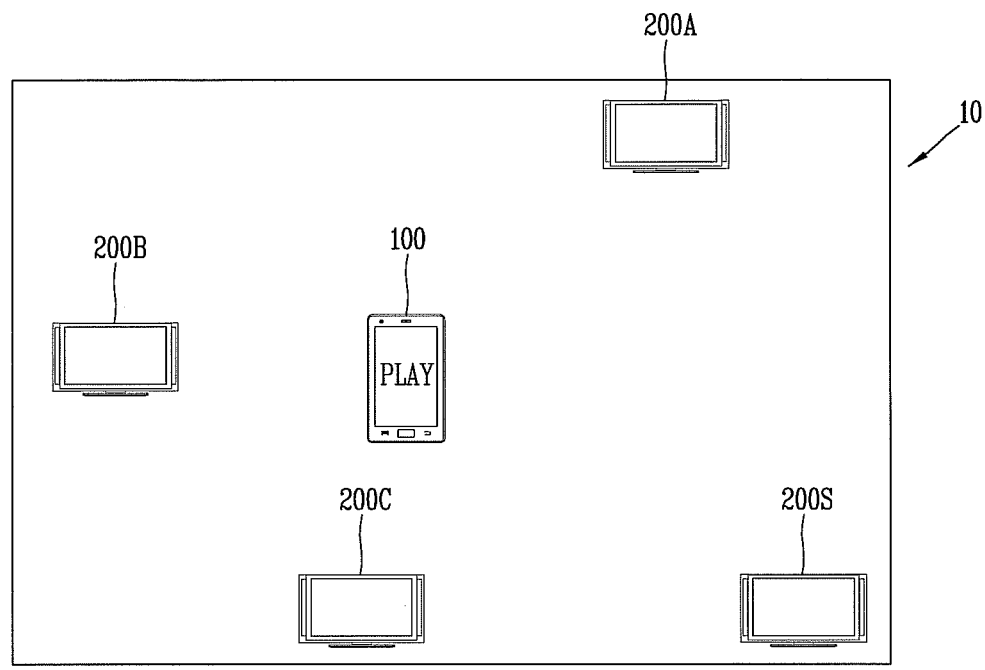
FIGS. 3A to 3D are diagrams illustrating an environment in which a plurality of devices are disposed.

Referring to FIG. 3A, the mobile terminal 100 may play contents selected by a user. If the user desires to play contents which are being played by the mobile terminal 100 on one of the plurality of devices 200A to 200C, the user may select one of the plurality of devices 200A to 200C as a target device.

To this end, the mobile terminal 100 may provide a user interface for selection of the target device. However, the selecting of the target device by the provided user interface may be cumbersome or become a burden to the user. In general, the user may wish to play contents through a device located at a position where the user can most easily view the contents from his current position. Hence, if the mobile terminal 100 is aware of a user's position and orientation, it can, for example, be configured to select a device which is located the closest and provides the best viewing angle.

Figure 3B:
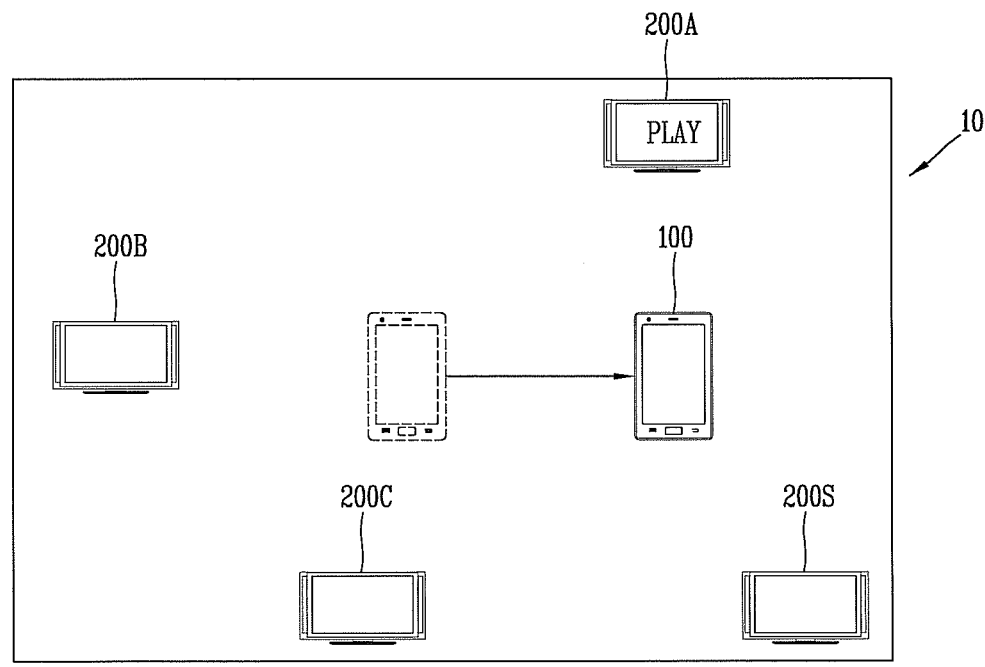

Referring to FIG. 3B, when the mobile terminal is moved from a position as illustrated in FIG. 3A to a position in FIG. 3B as the user moves, the device 200A may correspond to a device which is located at the closest position to the mobile terminal 100. Hence, the mobile terminal 100 may select the device 200A from the plurality of devices 200A to 200C as a target device, and transmit a signal to the device 200A for controlling the device 200A to continuously play the contents which are being played in the mobile terminal 100. Here, the mobile terminal 100 may stop the reproduction of the contents. Also, the mobile terminal 100 may output an indicator indicating that the device 200A is reproducing the contents. For example, the mobile terminal 100 may output an indicator, such as vibration, in a tactile manner such that the user can know that the contents, which are being played by the mobile terminal 100 or another device, are reproduced by the device 200A even without viewing a display of the mobile terminal 100.

In certain situations, the mobile terminal 100 may not designate a device for viewing content even if the mobile terminal 100 is moved from the position as illustrated in FIG. 3A to the position as illustrated in FIG. 3B. For example, in situations where the user does not want to continuously play the contents using the device 200A, such as when receiving a call at the mobile terminal 100, the mobile terminal 100 may not transmit the signal to the device 200A for controlling the device 200A to continuously play the contents which are being played by the mobile terminal 100.

Figure 3C:
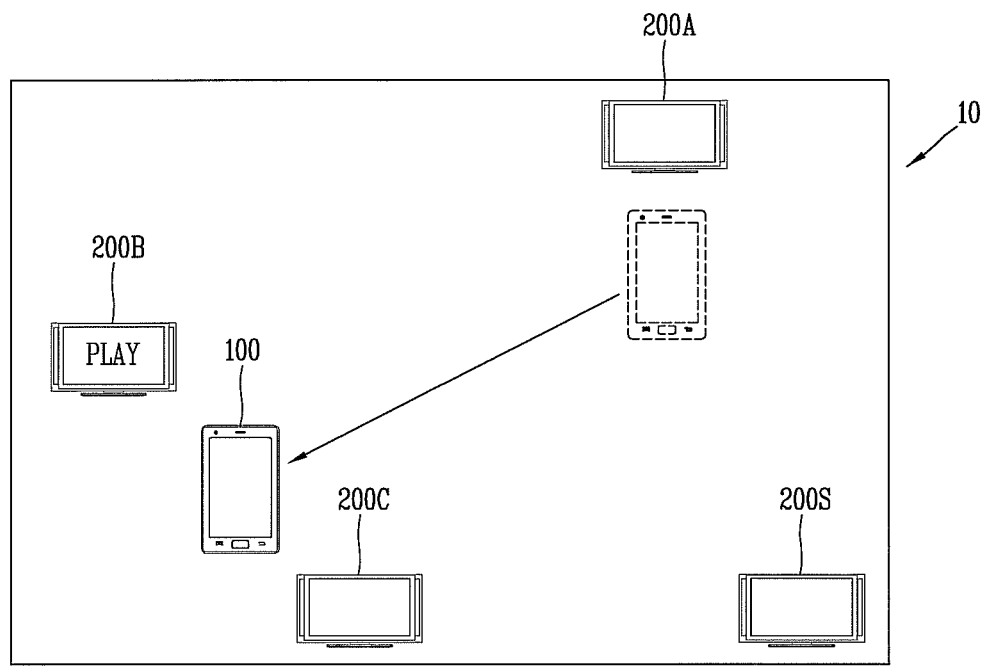

Referring to FIG. 3C, when the mobile terminal 100 is moved from the position of FIG. 3B to a position of FIG. 3C as the user continues to move, a device 200B and a device 200C may correspond to devices which are located the closest to the mobile terminal 100. However, when the user is facing device 200B, the user may desire to continuously play the contents on device 200B rather than on device 200C. Therefore, the mobile terminal 100 may select the device 200B as a target device from the plurality of devices 200A to 200C based on the sensed position and orientation, and transmit a signal to the device 200B for controlling the device 200B to continuously play the contents which are being played by the device 200A. Here, the mobile terminal 100 may also control the device 200A to stop the reproduction of the contents.

Figure 3D:
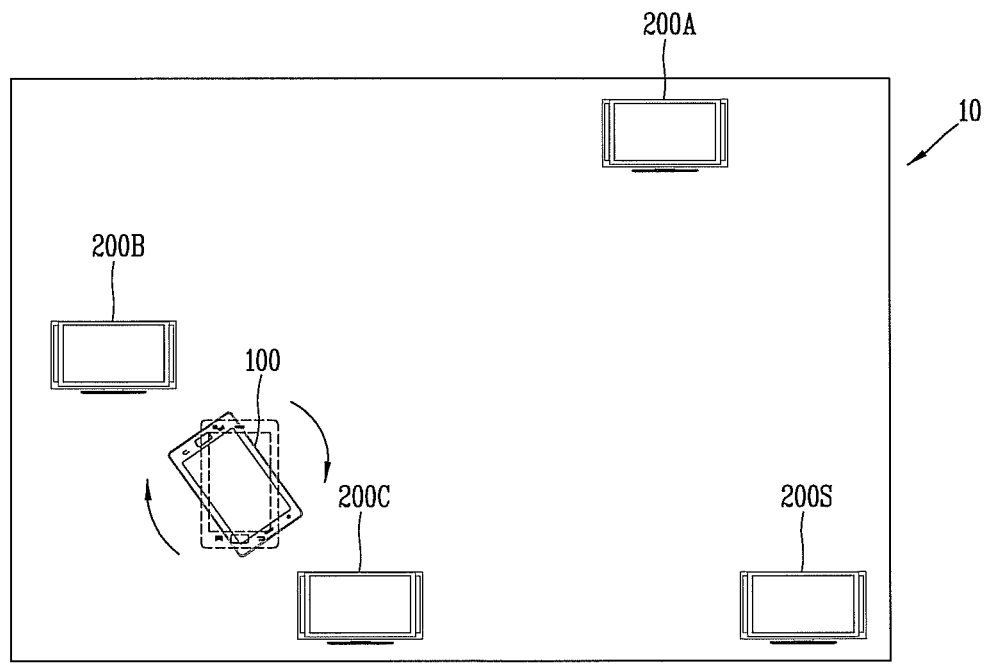

Referring to FIG. 3D, when the mobile terminal 100 is shifted from an orientation of FIG. 3C to an orientation of FIG. 3D as the user turns to face another direction, the device 200B and the device 200C still correspond to the devices which are the closest to the mobile terminal 100. However, since the user now faces the device 200C, the user may desire to continuously play the contents using device 200C rather than device 200B. Therefore, the mobile terminal 100 may select device 200C as a target device from the plurality of devices 200A to 200C, and transmit a signal to the device 200C for controlling the device 200C to continuously play the contents which are being played by the device 200B. Here, the mobile terminal 100 may also control the device 200B to stop the reproduction of the contents.

As such, the mobile terminal 100 may determine a position and an orientation of the user, automatically select a device, and provide an environment for allowing contents to be viewed through the selected device. It should be appreciated that, while a device which is closest to the user may be selected as the target device as described above, other variables or conditions may also be used to determine the device most suitable for the user based on the determined position and orientation. For example, the type of device, the type of content, user preference for certain devices, or the like, may also be used to determine the target device in addition to the mobile terminal position/orientation.

Figure 4A:
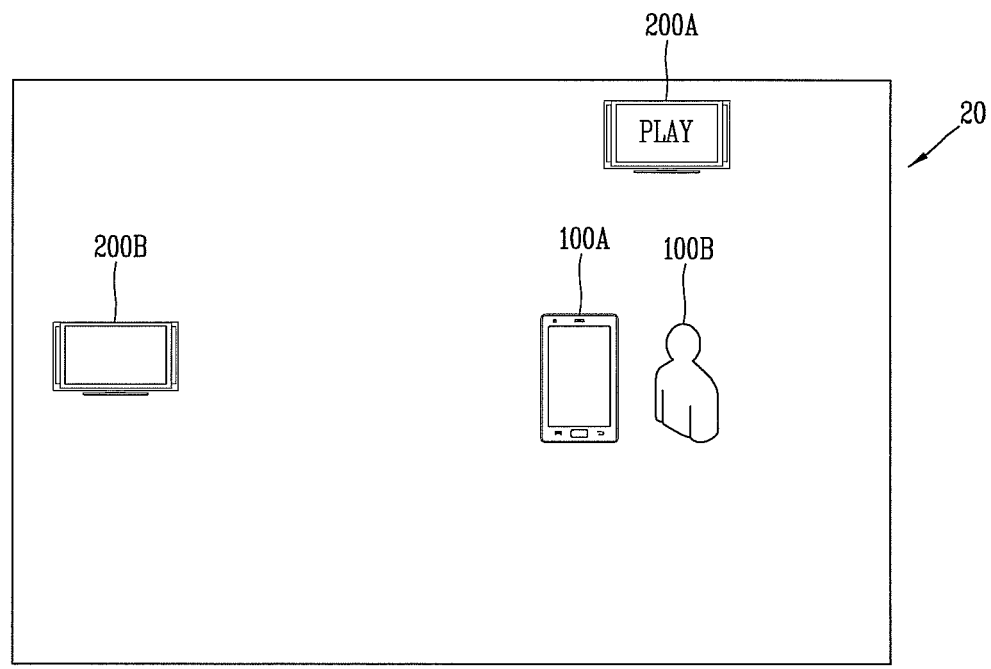
FIGS. 4A and 4B are diagrams illustrating another environment where a plurality of devices are disposed.
Figure 4B:
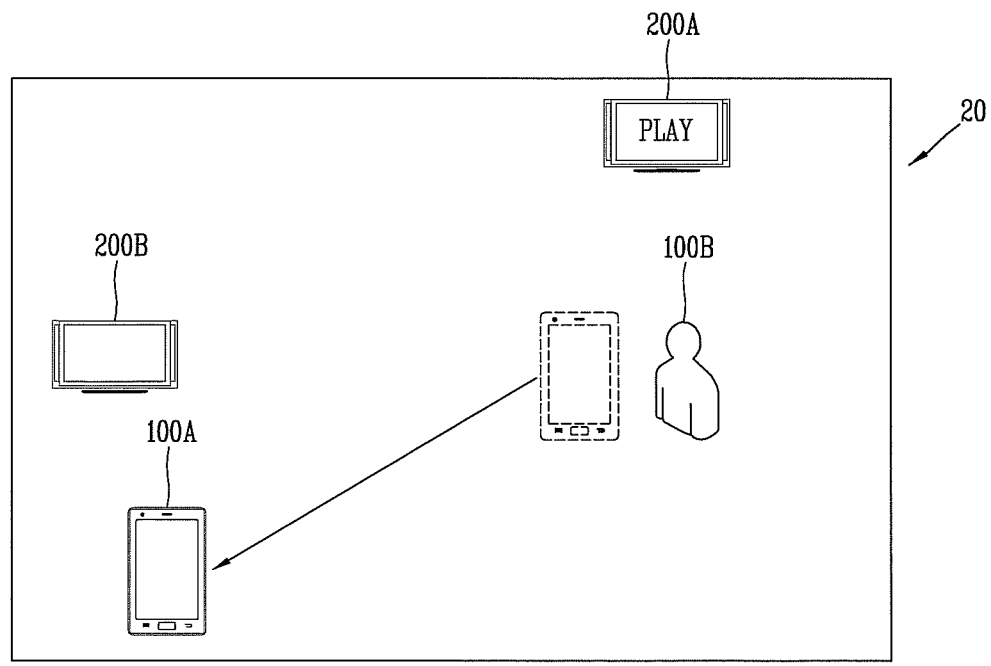

FIGS. 4A and 4B are diagrams illustrating another environment where a plurality of devices are disposed. As illustrated in FIG. 4A, a mobile terminal 100A may transmit to a device 200A, which is located the closest thereto, a signal for controlling the device 200A to continuously play contents, which are being played by the mobile terminal 100A. Here, another user 100B may also view the contents, which are being played by the device 200A, under control of the mobile terminal 100A. For example, the mobile terminal 100A may sense the second user 100B either through a camera which is located near the device 200A, or through communication between a mobile terminal belonging to the second user 100B and the device 200A.

As illustrated in FIG. 4B, under such condition, when the mobile terminal 100A is moved from a position of FIG. 4A to a position of FIG. 4B as the user moves, a device 200B may now correspond to a device which is the closest to the mobile terminal 100A. The mobile terminal 100A may then select the device 200B among available devices 200A and 200B as a target device, and transmit a signal to the device 200B for controlling the device 200B to continuously play the contents which are being played by the device 200A. Here, since the second user 100B is still viewing the contents which are being played by the device 200A, the mobile terminal 100A may transmit a signal to the device 200A to continue reproducing the contents as device 200A.

Consequently, the mobile terminal 100A may determine existence of another user who is viewing contents which are being played by a target device, as well as its user's position and orientation, thereby providing an environment for allowing its user to view the contents via a device, which is the closest to the user and comes into the user's view, without interrupting the another user who is also viewing the contents.

Figure 5:
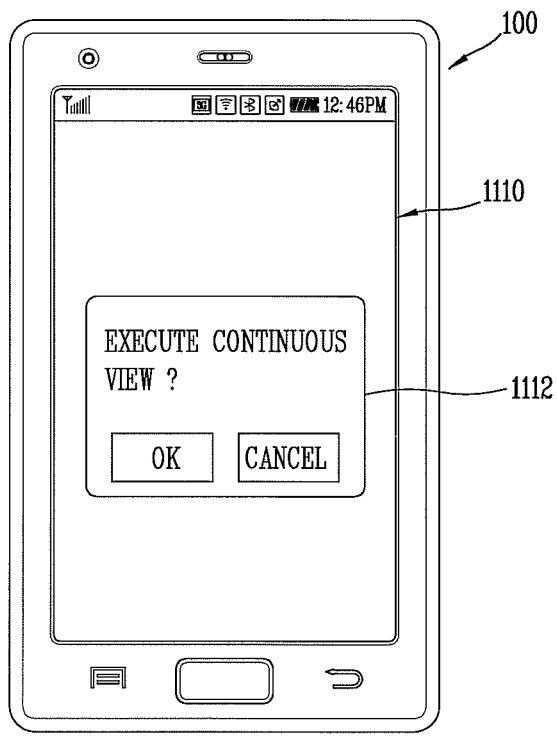
FIG. 5 is a view of a user interface provided in a mobile terminal in accordance with one exemplary embodiment.

FIG. 5 is a view of a user interface provided in the mobile terminal in accordance with one exemplary embodiment. Referring again to FIG. 3B, when the mobile terminal 100 is moved from the position of FIG. 3A to the position 3B as the user moves, the mobile terminal 100 may select the device 200A as a target device among the plurality of devices 200A to 200C. The mobile terminal 100, as shown in FIG. 5, may display on a screen 1110 (screen image) of the display 151 a menu 1112 for selecting whether to continue to play the contents which are being played by the mobile terminal 100 at the device 200A.

When a button (for example, 'OK') for continuous reproduction of the contents which are being played by the mobile terminal 100 is selected from the menu 1112, the mobile terminal 100 may transmit a signal to the device 200A for controlling the device 200A to continuously play the contents which are being played by the mobile terminal 100. On the contrary, when a button (for example, 'Cancel') for not continuously reproducing the contents which are being played by the mobile terminal 100 is selected from the menu 1112, the mobile terminal may not transmit a signal to the device 200A for controlling the device 200A to continuously play the contents which are being played by the mobile terminal 100. Once the device 200A begins to playback the content, a GUI may be displayed on the mobile terminal 100 to control the playback of the content on the device 200A.

Figure 6:
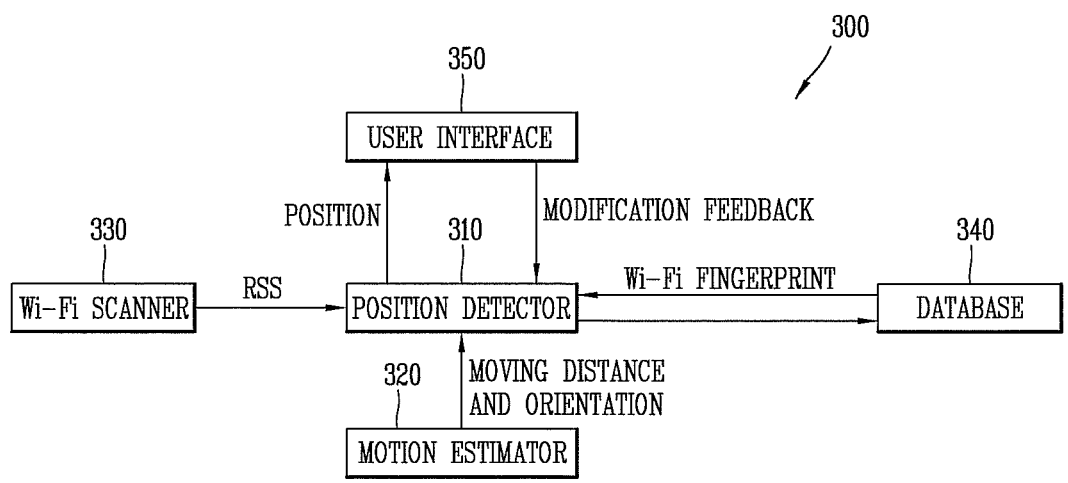
FIG. 6 is a block diagram that illustrates a process of a mobile terminal to acquire its own position information and orientation information.

FIG. 6 is a block diagram that illustrates a process in which the mobile terminal acquires its own position information and orientation information. A position acquisition system 300 may track a position of the mobile terminal 100 and the user inside a room such as a home using a Wi-Fi signal and an embedded motion sensor. Especially, a Wi-Fi fingerprint technology using Received Signal Strength (RSS) and RSS pattern may be used for indoor positioning, but accuracy may be limited in small rooms such as those in homes. Therefore, use of various motion sensors, such as an acceleration sensor, a gyro sensor, an orientation sensor and the like, which may be embedded in the mobile terminal 100, may be used to improve the accuracy of the Wi-Fi fingerprint-based positioning.

A position detector 310 may acquire a distance and orientation related to movement of the mobile terminal 100 (e.g., user) from a motion estimator 320 (for example, the sensing device 140). The motion estimator 320 may include an orientation sensor for detecting the user's orientation. Also, the motion estimator 320 may include an acceleration sensor or a gyro sensor for detecting the distance traveled.

The position detector 310 may divide user states into, for example, stationary (standing), walking and running states using the acceleration sensor or gyro sensor. Also, when the user is in the walking or running state, the position detector 310 may estimate a moving distance ($D_{Walking}$, $D_{Running}$) and an orientation (x, y) by multiplying a maintained time or duration ($T_{Walking}$, $T_{Running}$) of each state by a user's average speed ($V_{Walking}$, $V_{Running}$). The user's average speed may be learned based on data acquired from daily life and reflected using a probability function. For example, the average speed may be based on measured velocity of the mobile terminal 100 for a prescribed period of time, or a default average speed may be used.

When the user is in the walking or running state, the motion estimator 320 may estimate the user's distance moved and compute an orientation. The motion estimator 320 may then transfer the user's distance moved and orientation to the position detector 310. Also, a Wi-Fi scanner 330 (for example, an access point) may measure an RSS and transfer the measured RSS to the position detector 310. The position detector 310 may then estimate a user's position corresponding to the RSS transferred from the Wi-Fi scanner 330 using the RSS pattern stored in a database 340 (for example, the memory 160) and an internal algorithm.

When the user is in the stationary state, the position detector 310 may map the user's position onto a position with the highest probability, based on the user's moving distance and orientation obtained by the motion estimator 320 and the user's position estimated based on the RSS. The mapped user's position may be provided to the user via a user interface 350 (for example, the output device 150). Moreover, the user interface 350 may be used to adjust the position of the user. For example, the position detector 310 may receive a modification feedback from the user through the user interface 350 (for example, the user input device 130).

Figure 7:
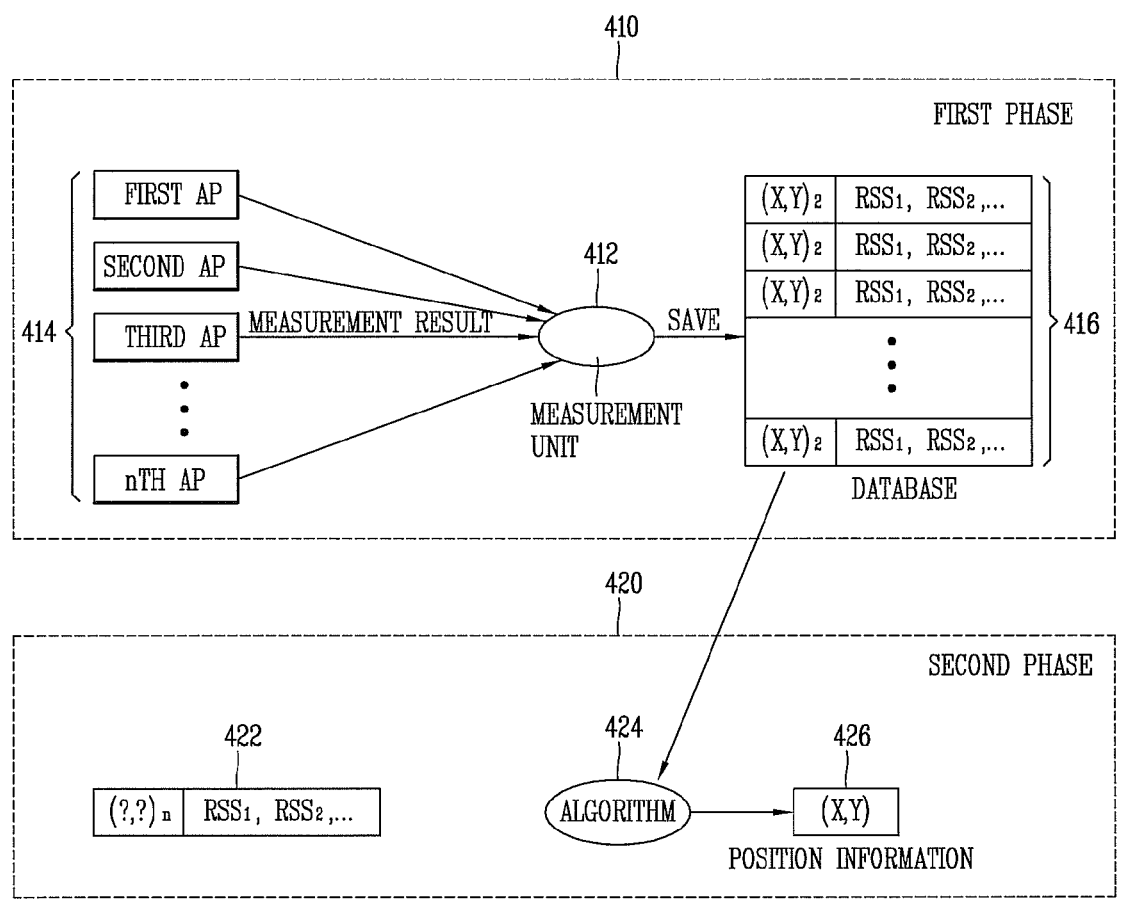
FIG. 7 is a block diagram that illustrates a process of a mobile terminal to perform Wi-Fi fingerprint.

FIG. 7 is a block diagram illustrating a process for performing Wi-Fi fingerprint in a mobile terminal. In a first phase 410 (e.g., a training mode), a measurement device 412 (for example, the position detector 310) may measure RSS from a plurality of access points 414. For example, the measurement device 412 may measure the RSS of the mobile terminal 100 located at a specific position ($x_i$, $y_i$) in the home. The measured RSS may be stored in a database 416.

In a second phase 420 (e.g., a matching mode), the measurement device 412 may determine a point 426 having an RSS pattern which is the most similar to the currently measured RSS pattern as the user's position. The user's position 426 may be determined based on the currently measured RSS pattern 422 of the mobile terminal 100, the database 416 generated in the first phase and an internal algorithm 424.

Besides, the mobile terminal may further recognize its own position using a Near Field Communication (NFC) tag installed at a plurality of positions of the specific location 10 or 20. Also, the position of the mobile terminal 100 may also be recognized using an optical sensor or a motion sensor of household electronics. For example, position and orientation may be determined using an image display device or a voice recognition module such as an oriented microphone of household electronics such as a robot cleaner.

Figure 8:
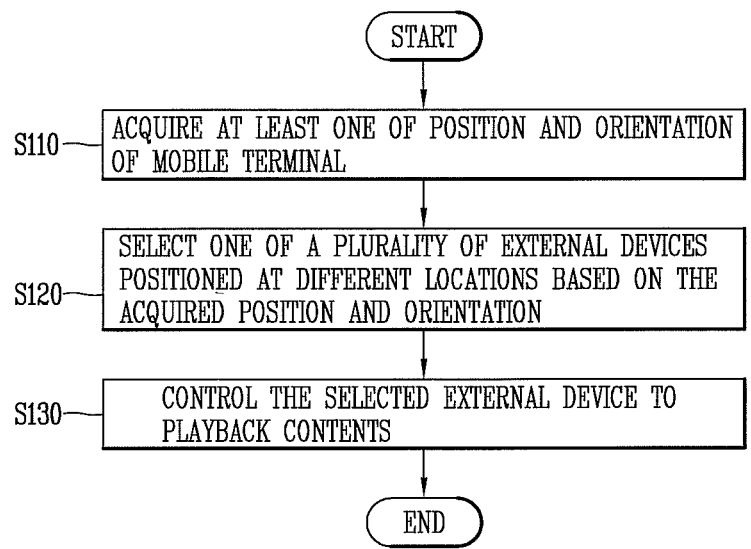
FIG. 8 is a flowchart of a process of controlling content reproduction in a mobile terminal in accordance with one embodiment.

FIG. 8 is a flowchart of a process of controlling contents reproduction in a mobile terminal in accordance with a one exemplary embodiment. A controller 180 may acquire at least one of position and orientation of a mobile terminal 100, in step S110. The controller 180 may select one of a plurality of external devices, which are able to play contents at different locations, based on the acquired position and/or orientation, in step S120. The controller 180 may thus transmit a signal to the selected external device for controlling the selected external device to play the contents, in step S130.

Figure 9:
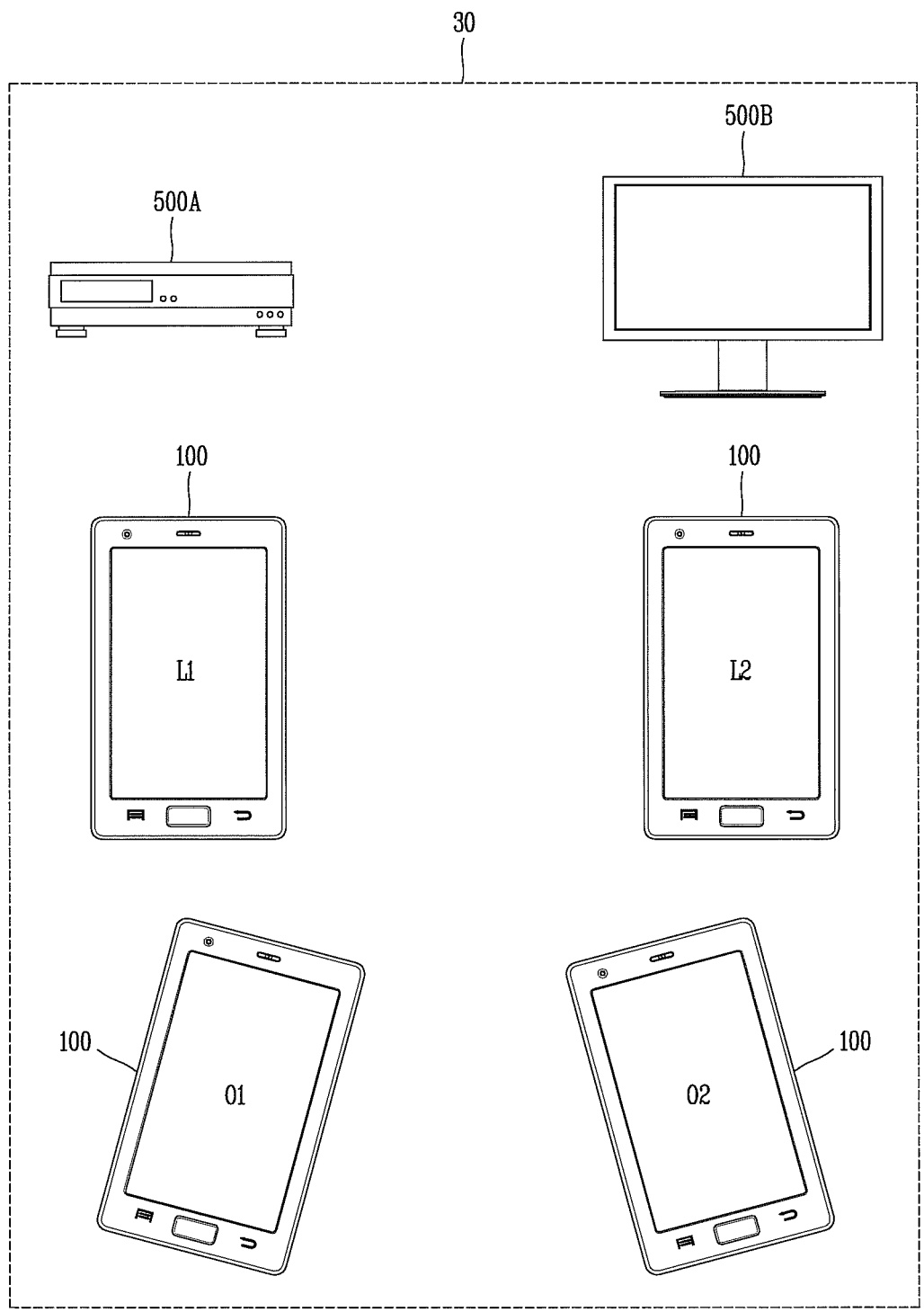
FIG. 9 is a diagram of an environment in which a plurality of devices are disposed.

In one embodiment, a mobile terminal may be configured to identify a user's intension (e.g., a user's predicted movement) by recognizing the user's condition and allows a user-desired device to be controlled according to the user's intension. FIG. 9 is a diagram of an environment in which a plurality of devices are disposed. A specific location 30 of the environment may be any of one or more rooms at the home, office, or the like. As shown in FIG. 9, the specific location 30 may include a mobile terminal 100, and a plurality of devices 500A and 500B.

The mobile terminal 100 may transmit an input (e.g., a user input) for controlling one of the plurality of devices 500A and 500B to the corresponding device. To this end, the mobile terminal 100 may use various types of communication methods, such as Bluetooth, Radio Frequency (RF) communication, InfraRed (IR) communication, Ultra Wideband (UWB), ZigBee, Wi-Fi, and the like. Also, the mobile terminal 100 may receive an image, voice, a data signal, or the like, output from one of the plurality of devices 500A and 500B. Such image, voice or data signal may be displayed on the mobile terminal 100 or output in form of voice or vibration.

Upon reception of the user input from the mobile terminal 100, the plurality of devices 500A and 500B may perform operations corresponding to the received user input. Examples of the plurality of devices 500A and 500B may include TV, a setup box, a refrigerator, a washing machine, and the like.

As illustrated in FIG. 9, when a user wants to control one of the plurality of devices 500A and 500B using the mobile terminal 100, one of the plurality of devices 500A and 500B should be selected as a target device. The mobile terminal 100 may provide a Graphic User Interface (GUI) for control of the selected device.

The mobile terminal 100 may provide a user interface for selecting a target device. However, the device selection via the user interface provided may be cumbersome or become a burden to the user. In general, since a user wants to control a device which is located at a position for easiest viewing from the current position, when the mobile terminal is informed of the user's position and orientation it may select a device which is the closest and within the user's view.

Referring to FIG. 9, a first device 500A and a second device 500B may be controlled in operation by a user input applied to the mobile terminal 100. A GUI for controlling the first and second device 500A, 500B may be provided on the mobile terminal 100. The GUI may be customized for each particular device or a generic GUI may be provided to control the devices.

When the mobile terminal 100 is positioned at location L1 (e.g., located closer to the first device 500A) or is oriented to have a prescribed orientation O2 (e.g., facing the first device 100A), the mobile terminal 100 may infer that the user intends to control the first device 500A rather than the second device 500B. Hence, the mobile terminal 100 may select the first device 500A as a target device based on the position L1 or orientation O2. Accordingly, the mobile terminal 100 may establish a connection to the first device 500A selected as the target device. When a user input for remote control is received, the mobile terminal 100 may transmit the received user input to the first device 500A.

Moreover, when the mobile terminal 100 is positioned at location L2 (e.g., located closer to the second device 500B) or is oriented to have a prescribed orientation O1 (e.g., facing the second device 500B), the mobile terminal 100 may infer that the user intends to control the second device 500B rather than the first device 500A. Hence, the mobile terminal 100 may select the second device 500B as a target device based on the position L2 or orientation O2. Accordingly, the mobile terminal 100 may establish a connection to the second device 500B selected as the target device. When a user input for remote control is received, the mobile terminal 100 may transmit the received user input to the second device 500B.

Moreover, It should be appreciated that, while a device may be selected based on proximity and/or orientation of the mobile terminal 100 as described above, other variables or conditions may also be used to determine the device most suitable for the user based on the determined position and orientation. For example, the type of device, the type of content, user preference for certain devices, or the like, may also be used to determine the target device.

The mobile terminal 100 may determine its own position and orientation by using the motion estimation technology based on the motion sensor and the position recognition technology based on the RSS and the RSS pattern, as previously described with reference to FIGS. 6 and 7. Accordingly, the mobile terminal 100 may automatically select a device by determining the user's position and orientation, and provide an environment allowing for remote control of the selected device.

Figure 10A:
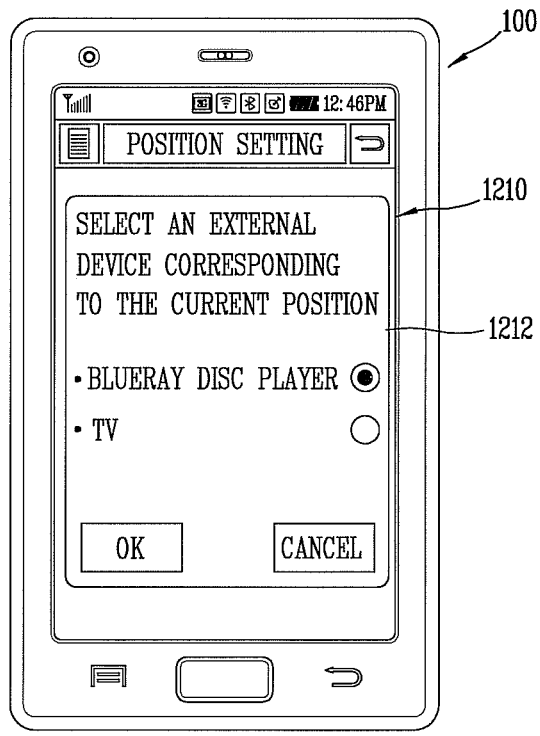
FIGS. 10A and 10B are views of a user interface provided in a mobile terminal in accordance with one exemplary embodiment.
Figure 10B:
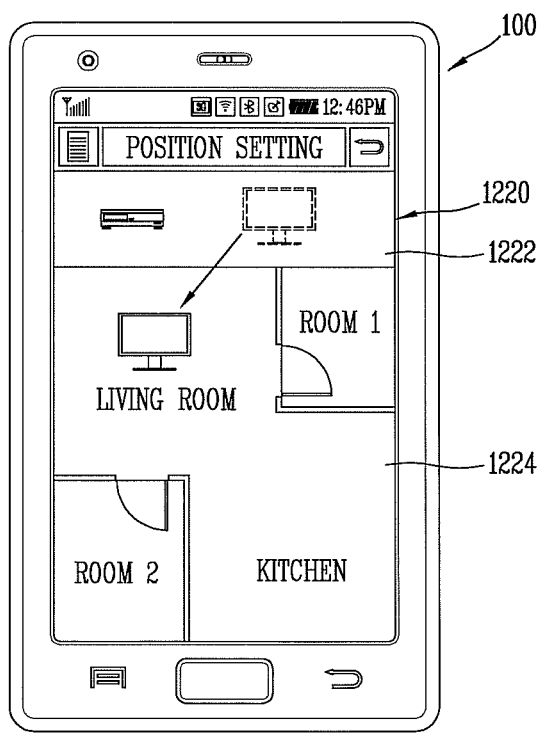

FIGS. 10A and 10B are views of a user interface provided in the mobile terminal in accordance with the one exemplary embodiment. In order to be aware of the relative position and orientation between the mobile terminal 100 and external devices, not only the position of the mobile terminal 100 but also positions of the respective external devices should be acquired. Hence, the mobile terminal 100 may provide an interface for inputting the positions of the respective external devices, such that the user can set the position of each external device in an easy and convenient manner.

Referring to FIG. 10A, the mobile terminal 100 may provide a user interface 1212 for allowing a position of each external device to be set on a screen image 1210 of the display 151. When the user positions the mobile terminal 100 near a particular device, selects the corresponding device, and presses a button (e.g., 'OK') for setting a position, the position of the corresponding device may be set as a current position of the mobile terminal 100.

Referring to FIG. 10B, the mobile terminal 100 may provide user interfaces 1222 and 1224 for setting a position of each external device on a screen image 1220 via the display 151. The user may position a device icon, which is displayed on a device select region 1222, into a map display region 1224, for example, by a drag & drop input. Accordingly, a position of the selected device may be set to a position displayed on a device map displayed in the map display region 1224.

Upon setting the position of each device, a device map indicating the position of each device at a specific locations (e.g., home, office, etc.) may be generated. The mobile terminal 100 may map its position and orientation onto the device map so as to select a target device.

Figure 11:
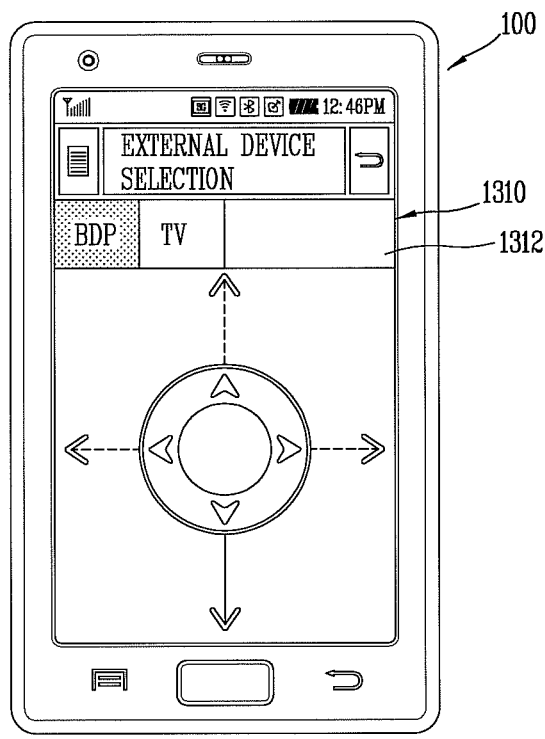
FIG. 11 is a view of a user interface for manually selecting a target device in a mobile terminal in accordance with one embodiment.

FIGS. 11 to 14 are diagrams of a user interface provided in a mobile terminal in accordance with one exemplary embodiment. FIG. 11 is a view of a user interface for manually selecting a target device in a mobile terminal. Referring again to FIG. 9, the mobile terminal 100 may be located at a position midway between the first device 500A and the second device 500B, or the first and second devices 500A and 500B may be located close to each other and accordingly there may exist many devices which are controllable at the current position and in the current orientation.

In this case, as illustrated in FIG. 11, the mobile terminal 100 may display a menu 1312 on a screen image 1310 for selecting a device that the user wants to control. The menu 1312 may be used to select a device among a plurality of devices which are controllable at the current position and in the current orientation. This method is much more intuitive from the user's perspective than the related art user interface for selecting a device to be controlled among available devices.

Figure 12:
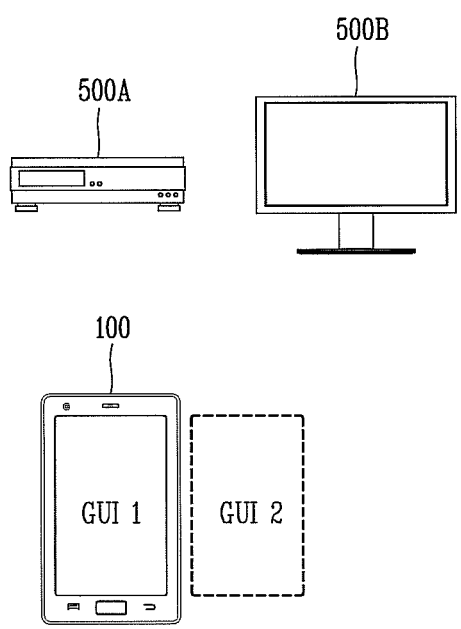
FIG. 12 is a diagram illustrating a user interface for selecting a target device among a plurality of devices in a mobile terminal in accordance with one embodiment.

FIG. 12 is diagram illustrating a user interface for selecting a target device from among a plurality of devices according to an embodiment. The plurality of devices may have a different GUI for display in the mobile terminal 100 for remotely controlling the device.

A GUI GUI1 provided by the mobile terminal 100 for remote control of the first device 500A may be different from a GUI GUI2 provided by the mobile terminal 100 for remote control of the second device 500B which is positioned in close proximity to the first device 500A. When the first device 500A is selected as a target device based on the position and orientation of the mobile terminal 100, the mobile terminal 100 may provide the GUI GUI1 corresponding to the first device 500A. The mobile terminal 100 may also load the GUI GUI2, which corresponds to the second device 500B positioned close to the first device 500A, from the memory 160 to a cache memory installed in the controller 180.

Thereafter, when the second device 500B is selected as the target device, the mobile terminal 100 may immediately convert the GUI GUI1 into the GUI GUI2 corresponding to the second device 500B loaded in the cache memory and display the GUI GUI2. Hence, the mobile terminal 100 can provide a flexible user interface environment.

Figure 13:
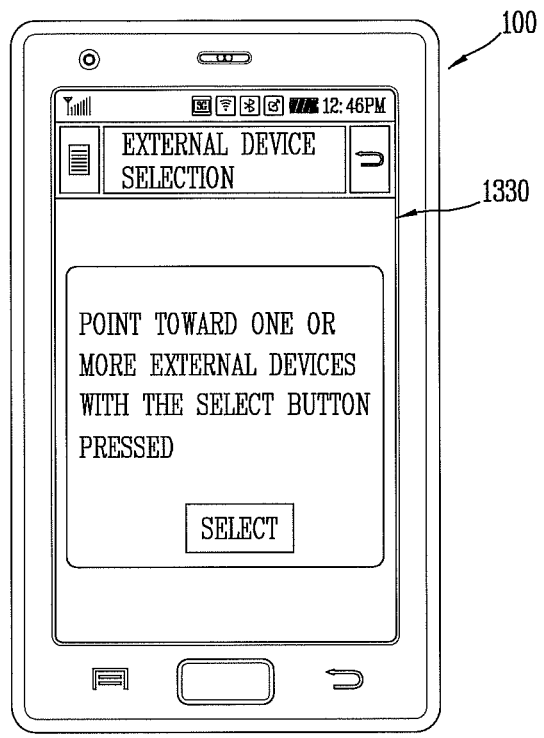
FIG. 13 is a view of a user interface for selecting a plurality of devices as target devices in a mobile terminal in accordance with one embodiment.

FIG. 13 is a view of a user interface for selecting a plurality of devices as a target device from a mobile terminal. Referring back to FIG. 9, when the first device 500A and the second device 500B are the same type of device having the same remote interface, the user may desire to remotely control the first and second devices 500A and 500B at the same time.

Referring to FIG. 13, the mobile terminal 100 may display an interface for selecting a plurality of devices as target devices on a screen image 1330. In a state in which a menu item (e.g., 'select') for selecting a plurality of devices as target devices has been selected, the user may make a gesture of sequentially pointing the mobile terminal 100 toward a plurality of devices to select as target devices. While the user makes the gesture, the mobile terminal 100 may determine its orientation so as to select the plurality of devices pointed by the user as the target devices. Therefore, the user may have an advantage of simultaneously controlling a plurality of target devices by one control command.

Figure 14:
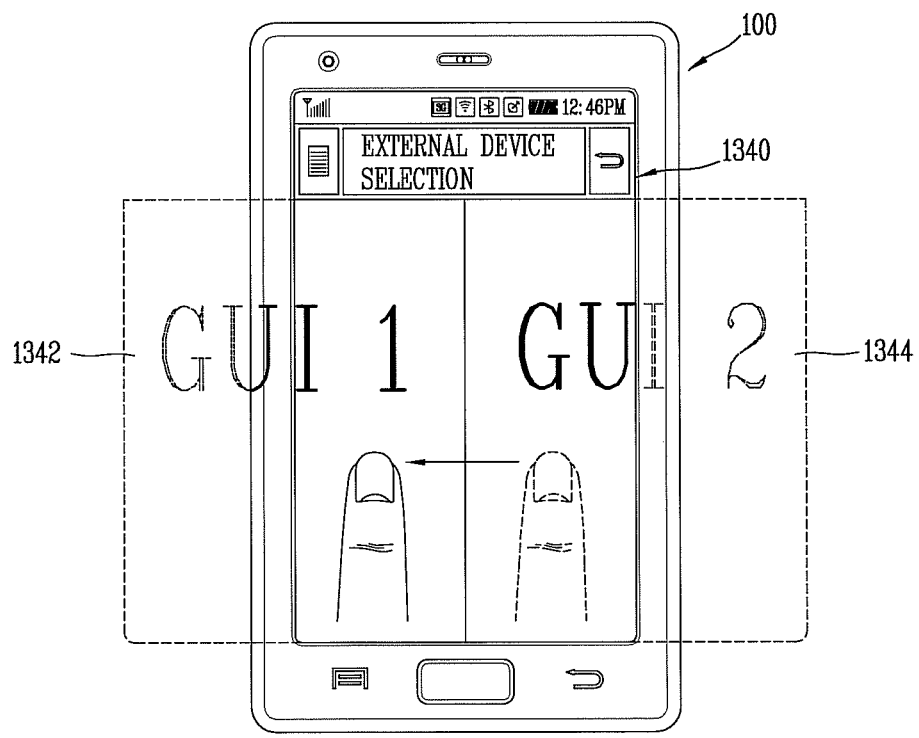
FIG. 14 is a view of a user interface for selecting a desired target device in a mobile terminal in accordance with one embodiment.

FIG. 14 is view of a user interface for selecting a desired device as a target device in a mobile terminal. Referring back to FIG. 9, a GUI GUI1 provided by the mobile terminal 100 for remote control of the first device 500A may be different from a GUI GUI2 provided by the mobile terminal 100 for remote control of the second device 500B located in close proximity to the first device 500A. Here, the user may desire to control the second device 500B positioned at location L1 or at an orientation O2, or control the first device 500A positioned at location L2 or at an orientation O1.

Referring to FIG. 14, the mobile terminal 100 may provide a touch interface for allowing a user to select a desired device as a target device even without moving the mobile terminal 100. With a GUI 1342 that correspond to the first device 500A being displayed on a screen image 1340 of the mobile terminal 100, when a touch input (drag, flipping, etc.) for selecting the second device 500B as a target device is applied, the second device 500B may be selected as the target device and a GUI 1344 for controlling the second device 500B may be displayed on the screen image 1340.

FIG. 15 is a flowchart of a process of controlling an external device in a mobile terminal in accordance with one embodiment. First, the controller 180 may acquire at least one of a position or orientation of the mobile terminal 100, in step S210. The controller 180 may select at least one of a plurality of external devices which can receive a remote control signal from the mobile terminal at different positions, based on the acquired at least one of position and orientation, in step S220. Also, the controller 180 may transmit the remote control signal to the selected at least one external device, in step S230.

In accordance with one exemplary embodiment, a mobile terminal can provide an environment that a user can continuously view contents through a plurality of devices located at different positions with moving or converting an orientation within a home environment. The continuous playing of the contents through the plurality of devices is automatically carried out, which may have an advantage of rarely requiring an overhead in selecting an external device by which the user will play the contents.

Also, in accordance with another exemplary embodiment, a mobile terminal can provide an environment for selectively carrying out a remote control for a plurality of devices using a single mobile terminal by a simple operation. Consequently, the process of selecting a device to be remotely controlled from the plurality of devices can be intuitively carried out, which results in easy and convenient manipulation.

In one embodiment, a method for controlling reproduction of contents in a mobile terminal may include acquiring at least one of position and orientation of the mobile terminal, selecting one of a plurality of external devices based on the acquired at least one of the position and the orientation, the plurality of external devices being capable of reproducing contents at different positions, respectively, and transmitting a signal to the selected one external device for controlling the selected one external device to reproduce the contents.

In one embodiment, a method for controlling an external device in a mobile terminal may include acquiring at least one of position and orientation of the mobile terminal, selecting at least one of a plurality of external devices based on the acquired at least one of the position and the orientation, the plurality of external devices being capable of receiving a remote control signal from the mobile terminal at different positions, respectively, and transmitting the remote control signal to the selected at least one external device.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling reproduction of content in a mobile terminal comprising:
   controlling display of content on the mobile terminal or on a first display device among a plurality of display devices;
   acquiring at least one of a position or an orientation of the mobile terminal;
   selecting a second display device among the plurality of display devices based on the acquired at least one of the position or the orientation, the plurality of display devices being positioned at different locations relative to the mobile terminal and configured to display the content;
   establishing a connection to the second display device; and
   transmitting a signal to the selected second display device for controlling the second display device to display the content,
   wherein the acquiring at least one of the position or the orientation of the mobile terminal includes
   estimating a motion of the mobile terminal and analyzing a Received Signal Strength (RSS) data measured by at least one wireless access point, while a change in position of the mobile terminal is detected, and
   acquiring an updated position of the mobile terminal based on the estimated motion of the mobile terminal and the analyzed RSS data when the change in position of the mobile terminal is no longer detected.

2. The method of claim 1, wherein the selecting the second device among the plurality of display devices includes selecting a display device that is positioned closest to the mobile terminal or a display device that is positioned corresponding to the orientation of the mobile terminal.

3. The method of claim 1, further comprising controlling the mobile terminal or the first display device to stop displaying the content and controlling the second display device to resume the content based on the signal.

4. The method of claim 1, further comprising controlling the mobile terminal or the first display device to continue displaying the content in response to a message from the second display device indicating a presence of another mobile terminal or a user accessing the content on the second display device.

5. The method of claim 1, wherein the transmitting the signal to the second display device includes
   receiving an input for controlling the selected second display device to display the content, and
   transmitting the signal for controlling the second display device to display the content according to the input.

6. The method of claim 1, wherein the acquiring at least one of the position or orientation of the mobile terminal includes
   acquiring the RSS data from the at least one wireless access point, and
   acquiring position information corresponding to RSS data having the most similar pattern to the pattern of the acquired RSS data from a database.

7. The method of claim 1, wherein the acquiring at least one of the position or orientation of the mobile terminal includes
   determining a type of movement based on the detected change in position of the mobile terminal, the type of movement including standing, walking or running, and
   estimating a position or orientation of the mobile terminal based on a duration of movement and a prescribed speed associated with the determined type of movement.

8. The method of claim 1, further comprising outputting an indicator that indicates that the second display device is displaying the content.

9. The method of claim 1, further comprising displaying a Graphic User Interface (GUI) on the mobile terminal to control playback of the content on the second display device.

10. A method for controlling an external device in a mobile terminal comprising:
    acquiring at least one of a position or an orientation of the mobile terminal;
    selecting at least one of a plurality of external devices based on the acquired at least one of the position or the orientation, the plurality of external devices being positioned at different locations and configured to receive a remote control signal from the mobile terminal;
    establishing a connection to the selected at least one external device; and
    transmitting the remote control signal to the selected at least one external device
    wherein the selected at least one external device is determined such that the selected at least one external device is positioned closest to the mobile terminal or the selected at least one external device is positioned corresponding to the orientation of the mobile terminal.

11. The method of claim 10, further comprising displaying a Graphic User Interface (GUI) on the mobile terminal for controlling the selected at least one external device.

12. The method of claim 11, wherein the mobile terminal includes a plurality of GUIs that correspond to one or more of the plurality of external devices for providing a remote control interface at the mobile terminal.

13. The method of claim 11, further comprising loading a second GUI corresponding to at least one second external device located near the selected at least one external device.

14. The method of claim 13, further including
    receiving an input to change the selected external device to the second external device, and
    changing the selected external device to the second external device and displaying the second GUI that corresponds to the changed external device.

15. The method of claim 10, wherein the transmitting the remote control signal to the selected at least one external device includes receiving an input for designating an external device among a plurality of selected external devices, and transmitting the remote control signal to the designated external device.

16. The method of claim 10, wherein the selecting at least one of the plurality of external devices includes selecting two or more external devices from the plurality of external devices based on at least one of a plurality of positions or orientations acquired in a sequential manner when the at least one of the plurality of positions or orientations of the mobile terminal is acquired in the sequential manner.

17. The method of claim 10, further including receiving an input for setting a position of each of the plurality of external devices.

18. The method of claim 10, further including outputting an indicator that indicates that the selected at least one external device is under control of the mobile terminal.

19. A mobile terminal comprising:

a display;

a sensor to sense a position and orientation of the mobile terminal;

a controller configured to acquire at least one of a position or orientation of the mobile terminal relative to a plurality of external devices, and select at least one of the plurality of external devices based on the acquired at least one of the position or the orientation, the plurality of external devices being positioned at different locations and configured to receive a control signal from the mobile terminal; and a communication device configured to transmit the control signal to the selected at least one external device, wherein the control signal controls the selected external device to playback content transferred from another device or remotely controls a prescribed function of the selected at least one external device, and wherein the selected at least one external device is determined such that the selected at least one external device is positioned closest to the mobile terminal or the selected at least one external device is positioned corresponding to the orientation of the mobile terminal.

* * * * *